(12) United States Patent
Johnson

(10) Patent No.: US 9,409,458 B2
(45) Date of Patent: Aug. 9, 2016

(54) VEHICLE WITH SUSPENSION SYSTEM

(71) Applicant: William C. Johnson, Leawood, KS (US)

(72) Inventor: William C. Johnson, Leawood, KS (US)

( * ) Notice: Subject to any disclaimer, the term of this patent is extended or adjusted under 35 U.S.C. 154(b) by 0 days.

(21) Appl. No.: 14/543,172

(22) Filed: Nov. 17, 2014

(65) Prior Publication Data

US 2015/0084301 A1  Mar. 26, 2015

(51) Int. Cl.
*B60G 5/02* (2006.01)

(52) U.S. Cl.
CPC ........ *B60G 5/025* (2013.01); *B60G 5/02* (2013.01); *B60G 2300/09* (2013.01)

(58) Field of Classification Search
CPC ...... B60G 5/02; B60G 5/025; B60G 2300/09; B60K 7/0015; E02F 3/3414
See application file for complete search history.

(56) References Cited

U.S. PATENT DOCUMENTS

| | | | |
|---|---|---|---|
| 1,802,256 A * | 4/1931 | Hutt | B60G 5/02 180/22 |
| 1,887,042 A * | 11/1932 | Rogers | B60G 5/02 180/11 |
| 1,912,498 A * | 6/1933 | Rayburn | B60G 5/02 180/22 |
| 2,103,381 A * | 12/1937 | Perkins | B60G 5/02 267/291 |
| 2,134,233 A * | 10/1938 | McKone | B60G 5/02 280/677 |
| 2,316,374 A * | 4/1943 | Townsend | B60G 5/02 280/677 |
| 2,444,692 A * | 7/1948 | Beyerstedt | E02F 3/3414 414/706 |
| 3,414,072 A * | 12/1968 | Hodges, Jr. | B62D 5/09 180/14.1 |
| 3,525,534 A | 8/1970 | Madler et al. | |
| 3,743,044 A * | 7/1973 | Scheele | B60G 5/02 180/22 |
| 3,917,306 A * | 11/1975 | Madler | B60G 11/08 280/104 |
| 4,034,997 A * | 7/1977 | Oosterling | B60G 5/02 180/308 |
| 4,116,298 A | 9/1978 | Hyler | |
| 4,152,000 A * | 5/1979 | Meisel, Jr. | B60G 17/005 188/272 |
| 4,602,800 A | 7/1986 | Persson | |
| 4,768,601 A * | 9/1988 | Okano | B60G 5/02 180/235 |
| 4,789,181 A * | 12/1988 | Baxter | B60G 5/02 280/681 |
| 4,872,700 A * | 10/1989 | Mellgren | B62D 49/08 280/677 |
| 5,339,611 A * | 8/1994 | Roderfeld | B60G 5/00 180/209 |
| 5,538,264 A | 7/1996 | Brown et al. | |
| 6,056,304 A | 5/2000 | Brambilla | |
| 6,322,090 B1 | 11/2001 | Chignoli et al. | |
| 6,584,710 B1 * | 7/2003 | Lin | B60G 3/145 172/2 |
| 6,834,736 B2 | 12/2004 | Kramer et al. | |
| 7,000,724 B2 * | 2/2006 | Lamela | B60G 5/02 180/24.05 |
| 7,510,198 B2 | 3/2009 | Rach et al. | |
| 7,753,179 B2 | 7/2010 | Robertson | |
| 8,262,101 B2 * | 9/2012 | Madler | B60G 21/023 180/24.11 |
| 8,297,634 B2 | 10/2012 | Bittner | |

FOREIGN PATENT DOCUMENTS

FI  WO 2012123630 A1 *  9/2012 ............... B60G 5/02

* cited by examiner

*Primary Examiner* — Laura Freedman
(74) *Attorney, Agent, or Firm* — Spencer Fane LLP

(57) ABSTRACT

A vehicle includes two wheels on each side, with the pair of wheels on the left side mounted on a single bar that pivots up and down about a pivot point (left side wheel pivot plate) fastened to an axle that runs through the vehicle chassis from side-to-side. A pair wheels on the right side is similarly mounted (right side wheel pivot plate) on the right end of the axle. A stabilizer bar and associated components are attached to the rear portion of both pivot plates limits the independence of the up and down motion of the pivot plates, stabilizing the vehicle.

9 Claims, 5 Drawing Sheets

VEHICLE WITH SUSPENSION SYSTEM

CROSS-REFERENCE TO RELATED APPLICATIONS

Not Applicable.

STATEMENT REGARDING FEDERALLY SPONSORED RESEARCH OR DEVELOPMENT

Not applicable.

SEQUENCE LISTING

Not applicable

BACKGROUND OF THE INVENTION

The present invention is related to a suspension system for vehicles that keeps the wheels in contact with the surface they encounter regardless of the terrain. More particularly, this is typically accomplished by using wheels and not a continuous track, but does not exclude continuous track, also known as a tank tread or a caterpillar track, which can also be used with the present invention.

DESCRIPTION OF THE RELATED ART INCLUDING INFORMATION DISCLOSED UNDER 37 C.F.R. 1.97 AND 1.98.

Many vehicles are designed and built for off-road use in applications such as mining, excavating, grading and so forth. Common types of such vehicles include, for example, excavators, front shovels, backhoe loaders, skid steer loaders, wheeled loaders track-type tractors, bulldozers, combines, lawnmowers and cutting decks, log loaders, combines, and the like. Often such vehicles are used on uneven or rough terrain. Vehicles having conventional suspension systems or no suspension like most skid steer vehicles, can lose traction when obstacles or sharp changes in terrain are encountered because one or more wheels lose contact with the ground. The resulting weight shift to the wheels that remain in contact with the ground causes the vehicle to become unstable and difficult to maneuver and frequently causes it to get stuck because when all the wheels are not in contact with the ground they can clearly not provide any traction. Consequently the vehicle may become stuck and have to be pulled back into an operating position by another vehicle, causing added and needless expense and delay in any project.

Several solutions have been developed that provide better traction on uneven or rough terrain, including for example placing several wheels along each side of a vehicle, rather than only two on each side, or providing the wheels with a track, such as a continuous track. Many of these proposed solutions have led to issued patents.

For example, U.S. Pat. No. 5,538,264 B1, issued to Brown et al. on Jul. 23, 1996, discloses an Agricultural Plowing Vehicle with Self-Leveling Suspension in which each of the two front wheels is connected to the chassis by a pair of suspension links, which creates a non-reactive suspension in which changes in vertical loading and hence loss of traction is minimized between the two front wheels. A similar arrangement on the two rear wheels provides the same benefits to the rear axle. This system does not provide the same benefit for wheels on the same side of the vehicle.

U.S. Pat. No. 4,602,800 B1, issued to Persson on Jul. 29, 1986, discloses a Tractor having a suspension system with central single pivot axle 12 that traverses the two sides of the tractor at its midpoint. The tractor has four wheels, two on each side of the vehicle. A separate pivot arm for each of the four wheels is connected to and pivots about the central axle at one end and to a wheel at the other end, so that each wheel can pivot up and down independently relative to the central axle. Separate hydraulic motors drive chain drives to drive the wheels. This arrangement allows each wheel to move up or down independently of the other wheels. This system also requires the use of a shock absorber connecting each pivot arm to the chassis to restrain and constrain the vertical movement of the wheels.

U.S. Pat. No. 4,116,298 B1, issued to Hyler on Sep. 26, 1978, discloses an Angled Roll Axis Suspension for Off-Road Vehicles comprising front and rear trucks, i.e., wheel sets on a common axle, connected by a draft frame, shown as a single solid beam. The axles are solid and the draft frame allows the front and rear wheels to move up and down independently of one another. The system is directed to steering that does not excessively deviate from the intended path when obstacles are encountered. This system is directed to vehicles that are very long.

Providing either a number of wheels, for example, four, six, eight, and so forth, on each side of a vehicle or providing continuous tracks on both sides of the vehicle are both are more expensive to develop, manufacture and maintain than are vehicles having only four wheels.

When a vehicle has a conventional sprung suspension system or essentially no suspension system, that is, wheels connected directly to the chassis, the up and down movement of the chassis follows the up and down movements of the wheels as they encounter variations in the evenness of the terrain or pronounced obstacles. Although a traditional suspension system having springs and shock absorbers or struts offers some instantaneous cushioning effect to the chassis and cab when obstacles are encountered, the up and down movements of the wheels are still largely duplicated in the up and down movements of the chassis.

An attached working tool, such as a bucket, scraper or mowing deck is, ultimately, rigidly attached to the vehicle and to its chassis. A disadvantage of previously known suspension systems, or no suspension system, is that when an obstacle or significant variations in terrain unevenness is encountered, the working tool is throw out of its alignment with the prevailing terrain. This reduces worker efficiency by requiring the worker to reorient the vehicle or repeat a previous movement, for example, scraping the same ground again.

None of the above references discloses or suggests a suspension system that allows vehicles with wheels to keep all wheels in contact with the ground regardless of the roughness of the terrain or that allows the working tool on a vehicle to follow a more steady line that is parallel to the ground, thereby providing a much higher level of performance of the attachments.

Therefore, there is a need for a vehicle with a suspension system that allows the working tool on a vehicle to follow a more steady line that is parallel to the ground, thereby providing a much higher level of performance of the attachments; that keeps the wheels in contact with the ground regardless of the roughness of the terrain and that provides the benefits of multiple wheels or continuous tracks on each side of the vehicle at lower cost and greater simplicity.

BRIEF SUMMARY OF THE INVENTION

Accordingly, it is a primary object of the present invention to provide a vehicle with a suspension system that allows the working tool on a vehicle to follow a more steady line that is parallel to the ground, thereby providing a much higher level of performance of the attachments.

It is another object of the present invention to provide a vehicle with a suspension system that keeps the wheels in contact with the ground regardless of the roughness of the terrain.

It is another object of the present invention to provide a vehicle with a suspension system that provides the benefits of multiple wheels or continuous tracks on each side of the vehicle at lower cost and greater simplicity.

These and other objects of the invention are achieved by mounting two wheels on a single member, a wheel pivot plate, which pivots about a single point at the midpoint of the vehicle chassis, with one such plate on each side of the vehicle and one wheel at each end of each wheel pivot plate. Each wheel is driven by its own dedicated motor, which is mounted on the inside surface of the wheel pivot plate directly aligned with the corresponding wheel, i.e., a direct-drive arrangement with power to all wheels. The drive motors are preferably hydraulic motors that derive their power from a central hydraulic pump, but may be electric motors or other types of motors. Alternatively, the pairs of wheels on each side of the vehicle may be driven by a single motor using a conventional drive system such as a chain drive or drive shafts connecting each wheel to a rotational power source, i.e., the drive system does not need to provide a direct drive separate motor to each wheel.

The two wheel pivot plates are loosely connected to each other by a stabilizer bar that is pivotally connected for horizontal rotation at a point on the chassis and, at each of its ends, to one of the wheel pivot plates. This results in all four wheels being connected to the chassis at only three points, that is, the two actual pivot points of the wheel pivot plates themselves and where the stabilizer bar is connected to the chassis. In most vehicles, each wheel is attached separately to the chassis, making, in most cases, four connections between the wheels and the chassis. In the present case, since the four wheels are connected to the chassis at only three points, when a wheel encounters an obstacle, the chassis will rise or fall by only one-half of the displaced movement of the wheel that encounters the obstacle, allowing the working tool to remain nearly parallel to the prevailing level of the terrain and thereby increasing the efficiency of the vehicle.

The suspension system of the present invention is most useful for off-road vehicles that are typically driven very slowly.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

DETAILED DESCRIPTION OF THE INVENTION

Figure 1:
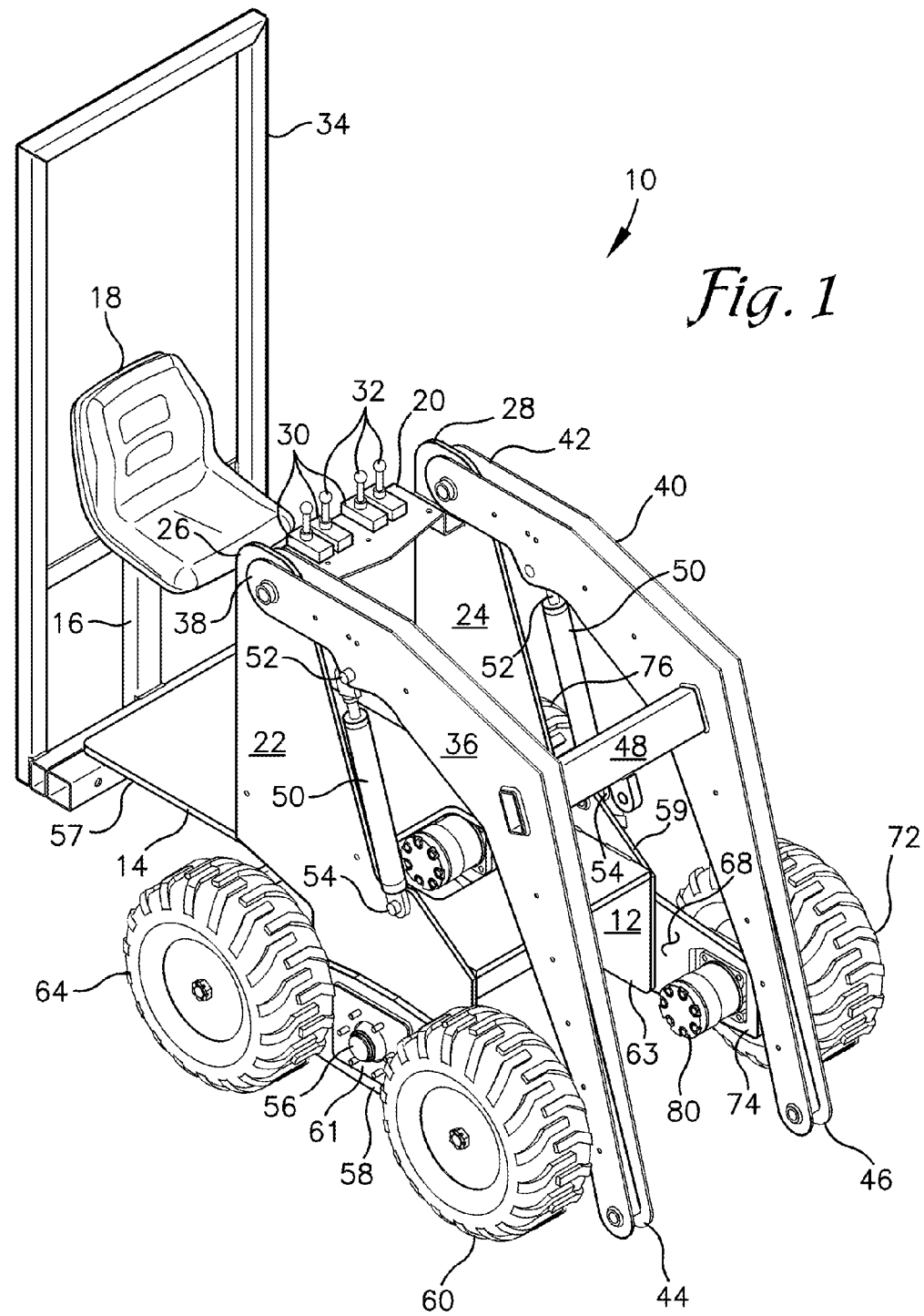
FIG. 1 is an isometric view of a vehicle equipped with a suspension system according to the present invention.

Referring to FIG. 1, the vehicle 10 includes a chassis 12 with a floor platform 14 fastened to the top surface of the chassis 12 having a seat post 16 connected to it and a seat 18 mounted on the top of the seat post 16. A dashboard 20 is horizontally mounted between the right side upstanding side plate 22 and the matching opposed and parallel left side upstanding side plate 24 adjacent to their upper ends, 26, 28 respectively. Suitable vehicle control valves 30 are mounted on the dashboard 20 and are operated by the control levers 32. A vertical frame 34 at the rear of the vehicle 10 is mounted on the floor platform 14, where it serves to support a horizontal debris-catching safety screen (not shown) and as a safety roll bar. A right side bucket arm 36 has an upper end 38 pivotally mounted at the upper end 26 of the right side upstanding side plate 22. A left side bucket arm 40 has an upper end 42 pivotally mounted at the upper end 28 of the left side upstanding side plate 24. The right side bucket arm 36 has a distal end 44 and the left side bucket arm 40 has a distal end 46. The two bucket arms 36, 40 are identical and are held in spaced parallel relationship by their fastenings and the cross brace 48, which is fastened to them. A tool (not shown) such as a bucket, auger, plow or the like is attached to the distal ends 44, 46 of the bucket arms 36, 40 for specific work tasks. The bucket arms 36, 40 are raised and lowered by a double-acting hydraulic rams 50, with one double-acting hydraulic ram 50 raising one bucket arm 36, 40. The top end 52 of each double-acting hydraulic ram 50 is pivotally connected to an upper portion of the associated bucket arm 36, 40 and at its lower end 54 to an intermediate low point of the respective upstanding side plates 22, 24.

Figure 2:
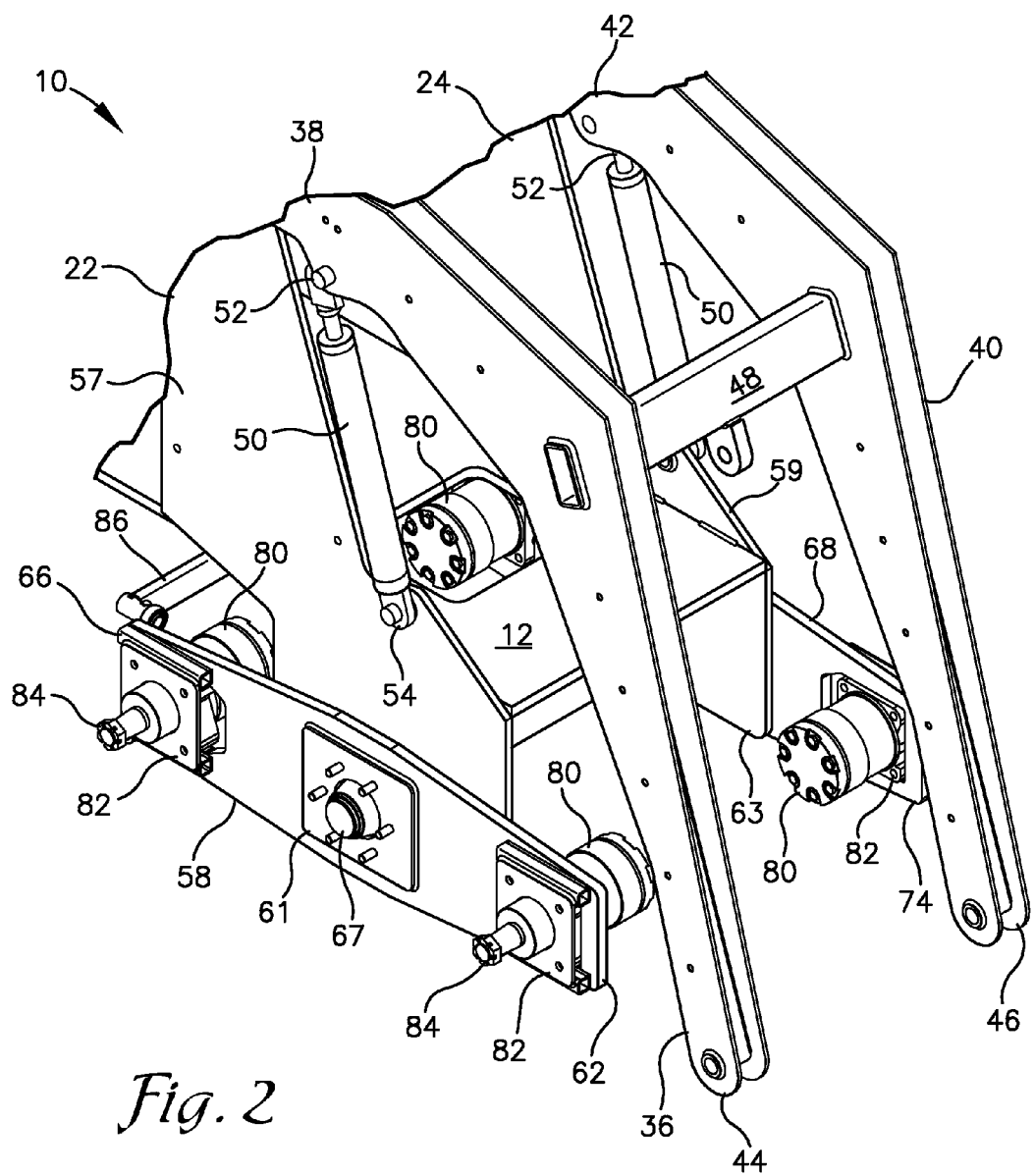
FIG. 2 is an isometric view of the chassis and related parts portion of the vehicle of FIG. 1.
Figure 3:
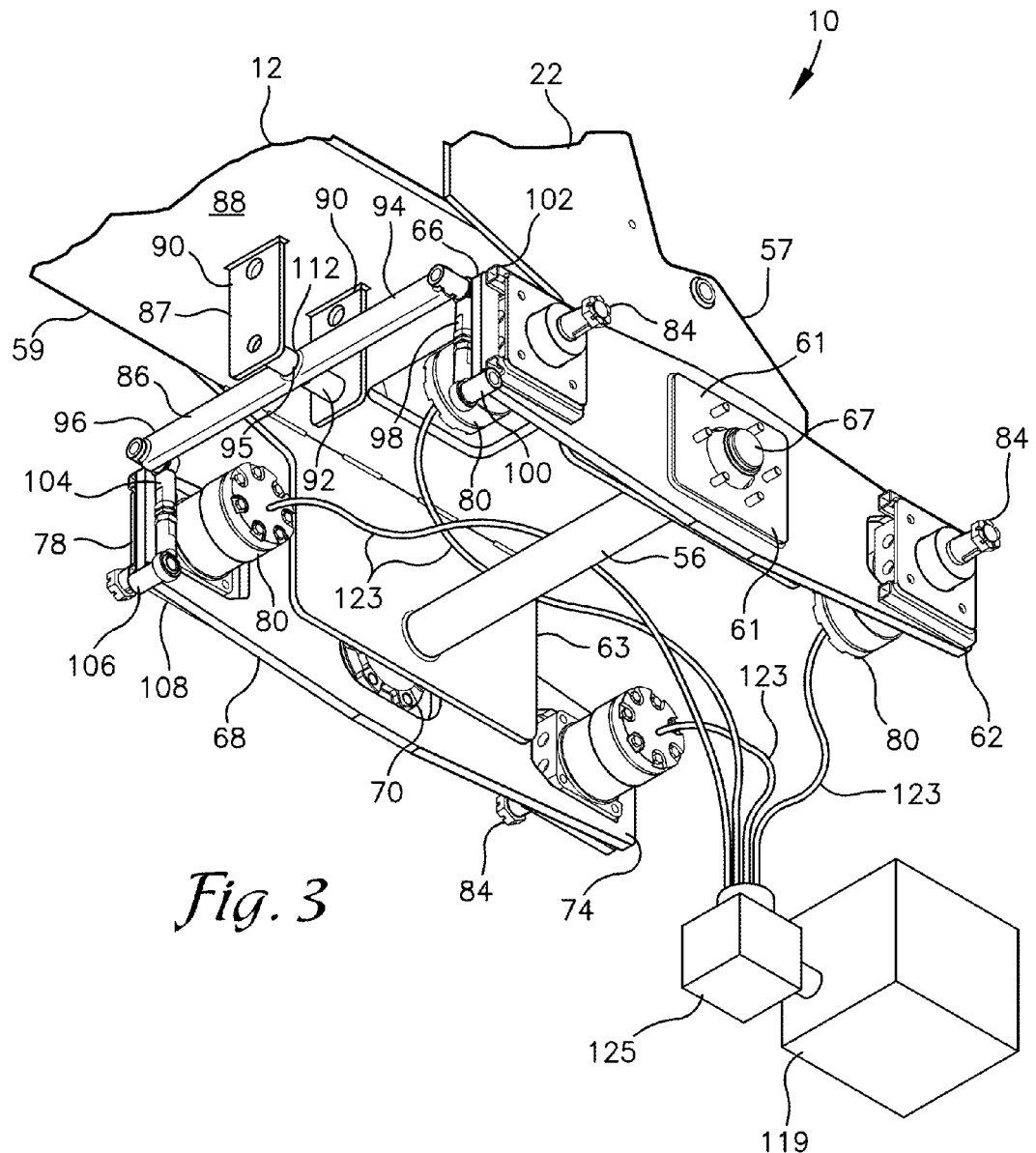
FIG. 3 is an isometric view of the chassis and suspension system of the vehicle of FIG. 1 shown from underneath the vehicle.
Figure 4:
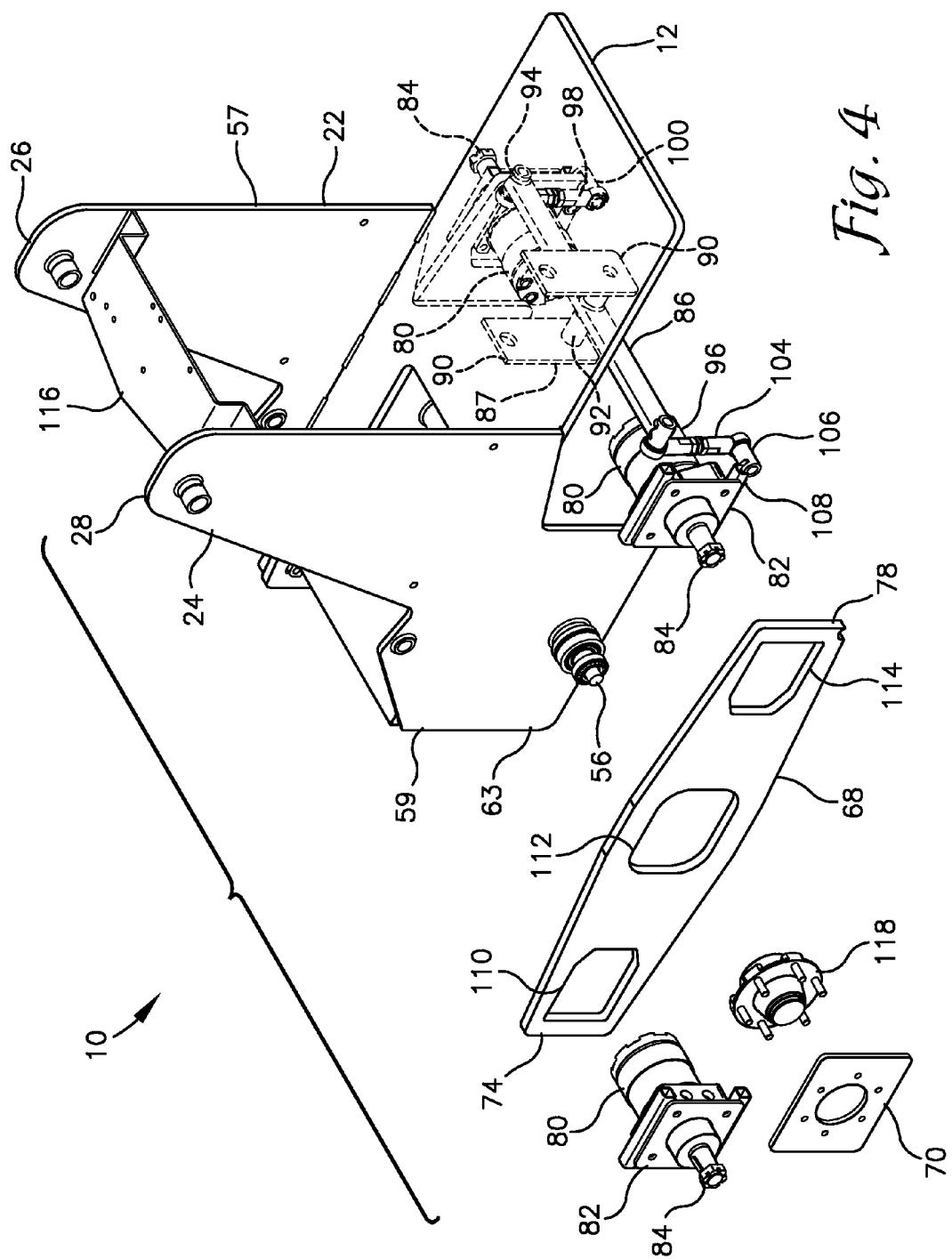
FIG. 4 is an exploded isometric view of the chassis of the vehicle of FIG. 1.

Still referring to FIG. 1, the suspension system of the vehicle 10 includes a transverse axle 56 (best seen in FIG. 3), a left side wheel pivot plate 68 pivotally mounted on the axle 56 on the left side 59 of the vehicle 10 and carrying two tire and wheel assemblies (or wheels) 72, 76, a right side wheel pivot plate 58 carrying two wheel and tire assemblies (wheels) 60, 64 pivotally mounted on the right side 57 of the vehicle 10 end of the axle 56, and the stabilizer bar 86 and associated components (FIG. 3,4). The wheels 60, 64, 72, 76 are all mounted for driven rotation. The transversely mounted axle 56, which does not rotate, and which runs from the right side 57 of the vehicle 10 to the left side 59 of the vehicle 10 lies transversely to the length of the vehicle 10. The transverse axle 56 is inserted through aligned apertures in a depending skirt portion 63 of each of the right and left upstanding side plates 22, 24. A right side wheel pivot plate 58 is pivotally connected to the axle 56 by the right side axle hub 67 secured to the right side wheel pivot plate 58 by the hub plate 61, that is, on the right end of the axle 56. The transverse axle 56 is mounted about one-third of the overall length of the completed vehicle 10 back from the front edge of the vehicle 10 and is mounted perpendicular to the longitudinal centerline of the vehicle 10 and is horizontally oriented when the vehicle 10 is on a level surface. A front right wheel and tire assembly 60 is mounted adjacent to a front end 62 (FIG. 2,3) of the right side wheel pivot plate 58 and a rear right wheel and tire assembly 64 is mounted adjacent to a rear end 66 (FIGS. 2, 3) of the right side wheel pivot plate 58. A left side wheel pivot plate 68 is pivotally connected to the left end of the axle 56 by the hub plate 70 (best seen in FIG. 3). A left front wheel and tire assembly 72 is mounted on the left side wheel pivot plate 68 adjacent to its front end 74 and a rear left wheel and tire assembly 76 is mounted on the left side wheel pivot plate 68 adjacent to its rear end 78 (FIGS. 3, 4). Each wheel and tire assembly 60, 64, 72, 76, is direct driven by a separate dedicated hydraulic motor 80 mounted in line with the center of a wheel and powered by hydraulic lines connected to a hydraulic pump (not shown). Electric motors could also be used, as could any other suitable drive means that delivers power to each wheel. It is not necessary that each wheel be driven entirely independently of the other wheels, but each wheel preferable is driven, i.e., not an idler.

Referring to FIG. 2, each motor 80 is mounted on the inside of the respective wheel pivot plates 58, 68, is held in place by the motor mounting plate 82 and has a drive shaft 84 penetrating an aperture in the wheel pivot plates 58, 68 and the motor mounting plate 82 and extending to beyond the outside surface of the respective wheel pivot plate 58, 68. The tire and wheel assemblies 60, 64, 72, 76 are fastened to these drive shafts 84. A stabilizer bar 86 connects the two wheel pivot plates 58, 68. The stabilizer bar 86 is discussed in connection with FIGS. 3, 4, below.

Referring to FIG. 3, the stabilizer bar 86 limits the up and down movement of the rear portion of the wheel pivot plates 58, 68, which is necessary to prevent the vehicle 10 from tipping over sideways if one side of the vehicle 10 would otherwise be raised so high that the center of gravity of the vehicle 10 falls outside of the width of the distance between the two rear wheel and tire assemblies 64, 76. The stabilizer bar 86 runs from the right side 57 of the vehicle 10 to the left side 59 perpendicular to the longitudinal centerline of the vehicle 10. A stabilizer mounting bracket 87 is fixed to the lower surface 88 of the chassis 12 and includes a pair of spaced parallel depending bracket plates 90 having a horizontal fixed axle 92 fixed between them. The stabilizer bar 86 includes a central aperture 112 that the axle 92 passes through, allowing the right end 94 and the left end 96 of the stabilizer bar to pivot up and down. The right end 94 of the stabilizer bar 86 is pivotally connected to a right vertical stabilizer member 98, which is pivotally connected to a right horizontal stabilizer element 100, which is pivotally connected to the lower rear portion 102 of the right wheel pivot plate 58. The left end 96 of the stabilizer bar 86 is pivotally connected to a left vertical stabilizer member 104, which is pivotally connected to a left horizontal stabilizer member 106, which is pivotally connected to the lower rear portion 108 of the left side wheel pivot plate 68. The left and right sides of the stabilizer system are symmetrical and the respective parts interchangeable. This suspension system allows some limited change in the distance between the wheel pivot plates 58, 68.

Referring to FIGS. 3, 4, each wheel pivot plate 58, 68 is basically a rectangular shape that is widest at the midpoint of its length and has a front aperture 110 that the drive shaft 84 of the front hydraulic motor 80 passes through, a central aperture 112 that the transverse axle 56 passes through and rear aperture 114 that the drive shaft 84 of the rear hydraulic motor 80 passes through. Connecting the upper ends 26, 28 of the right and left upstanding side plates 22, 24 is a horizontal reinforcing frame member 116, upon which the dashboard 20 and the control valves 30 and control lever 32 (all in FIG. 1) are mounted. The hub plate 70 is fastened to the left wheel pivot plate 68 by screws to hold the left side axle hub in place and to allow the left wheel pivot plate 68 to pivot.

Referring to FIG. 3, an internal combustion engine 119 drives a hydraulic accumulator 125. The resulting pressurized hydraulic fluid is distributed individually to each hydraulic motor 80 and, after use, returned to the hydraulic accumulator 125 through the hydraulic lines 123, each of which includes a separate high pressure delivery line and a reduced pressure return line. Power to the motors 80 is controlled through manipulation of the vehicle control valves 30 (FIG. 1).

The vehicle 10 with suspension system is intended primarily for off-road use. It can be scaled up or down to nearly any desirable size. More than two wheels can be attached to each side of the vehicle if desired. The wheel pivot plates 58, 68 are preferably made from one piece of steel, but can be made from a variety of suitable materials, for example, aluminum, carbon fiber, and so forth. Additional suspension parts can be added, such as shock absorbers, if desired.

Figure 5:
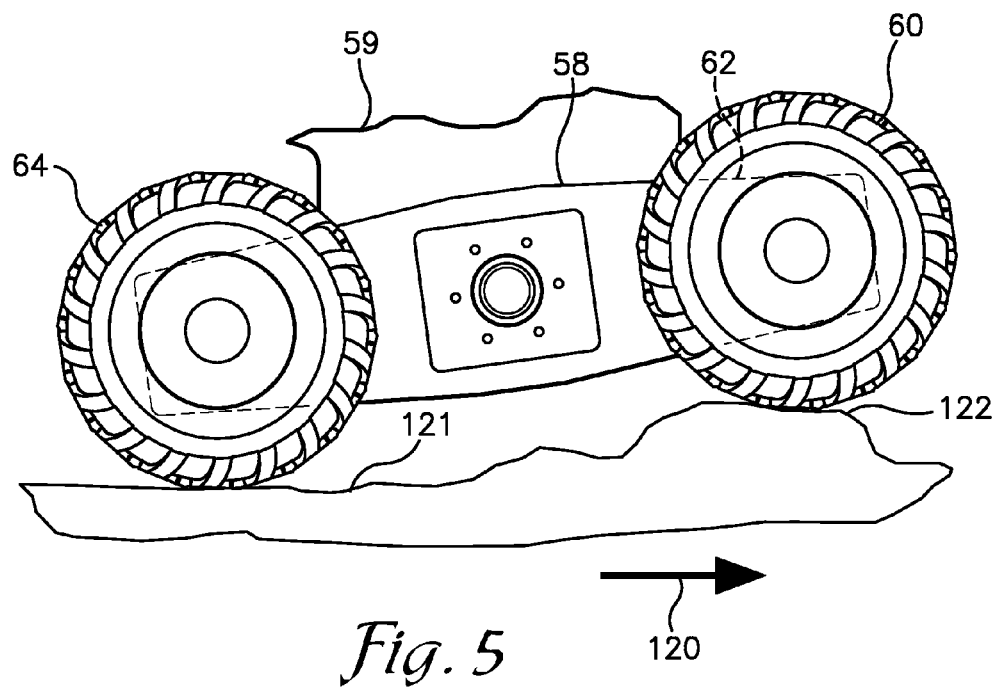
FIG. 5 is a schematic side view of the wheel pivot plate and attached wheels from the right side of the vehicle showing the reaction of the suspension system to encountered obstacles with an obstacle at the front wheel.
Figure 6:
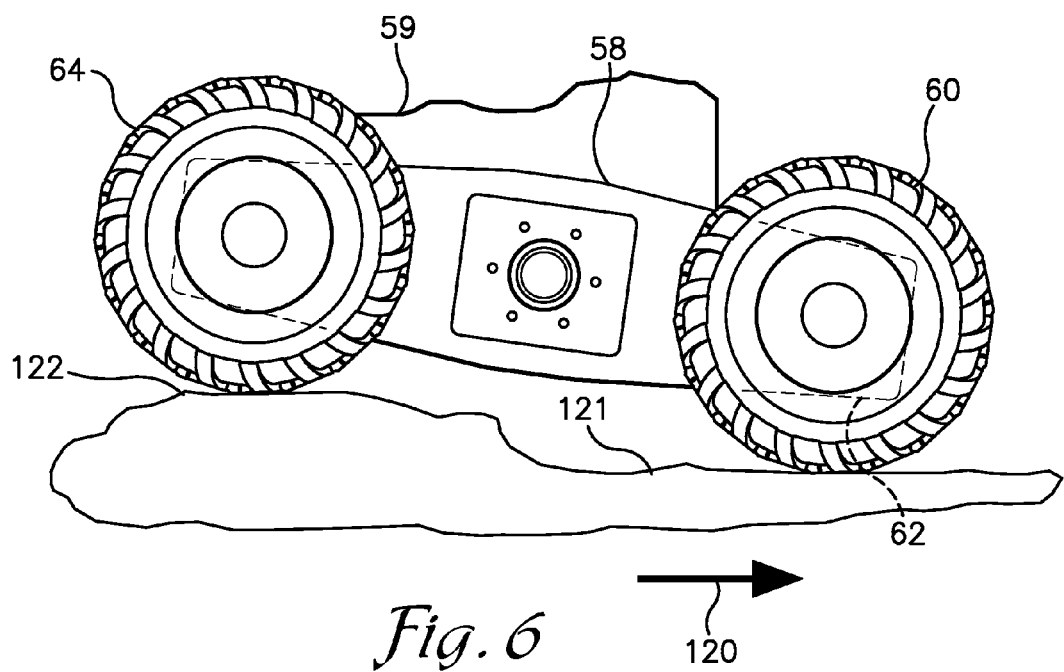
FIG. 6 is a schematic side view of the wheel pivot plate and attached wheels from the right side of the vehicle showing the reaction of the suspension system to encountered obstacles with an obstacle at the rear wheel.

Referring to FIG. 5, when the vehicle 10 is moving in the direction of the arrow 120 and encounters an obstacle 122 is encountered, the front wheel rises up to move over the obstacle 122, as shown, without the now elevated wheel 60 losing contact with the ground 121. As the vehicle 10 moves forward, the obstacle 122 is presented to the right rear wheel 64, which moves to climb over the obstacle 122 by moving up as the rear end 66 of the wheel pivot plate 58 pivots about the hub 67 on the transverse axle 56, driving the right front wheel and tire assembly 60 downward, applying more downward for to it and thereby increasing its traction. The left wheel pivot plate 68 operates in the same way. The two wheel pivot plates 58, 68 are preferably identical parts, although they need not be. Moreover, the two wheel pivot plates 58, 68 pivot independently of each other, constrained only by the stabilizer bar 86 and associated components, discussed in connection with FIG. 4, above.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims. For example, the vehicle described in this paper has an essentially hard direct connections to the chassis, but alternative embodiments can include active suspension systems with springs, shock absorbers, struts and pivotal control links.

I claim:

1. A vehicle comprising:
   a. a chassis having a left side and a right side; and
   b. a suspension system connected to said chassis and at least two wheels mounted for rotation on said suspension system on said left side of said vehicle and at least two wheels mounted for rotation on said suspension system on said right side of said vehicle and adapted for allowing said two left wheels to move up and down about a pivot point between them and for allowing two said right wheels to move up and down about a pivot point between them,
   said vehicle further comprising a drive system operatively connected to said wheels;
   said two left wheels being mounted on a left wheel pivot plate and said two right wheels being mounted on a separate right wheel pivot plate, each said pivot plate being pivotally mounted on a point along said chassis, said wheel pivot plates being mounted for pivotal rotation on a single axle that is mounted on said chassis transversely to the length of said vehicle, said axle being fixed in said chassis, said vehicle further comprising a stabilizer system connected to said chassis and limiting the up or down motion of said four wheels in response to obstacles encountered on the ground, said stabilizer system further comprising a stabilizer bar pivotally connected to a lower surface of said chassis for movement in a vertical plane and to each said wheel pivot plates.

2. A vehicle in accordance with claim 1 further comprising a drive system for delivering power to each said wheel.

3. A vehicle in accordance with claim 1 further comprising a separate motor connected to each said wheel.

4. A vehicle in accordance with claim 3 wherein each said separate motor further comprises a hydraulic motor.

5. A vehicle in accordance with claim 1 further comprising a pair of bucket arms having upper ends pivotally connected to said vehicle and having distal ends to which working tools may be attached and means for raising and lowering said bucket arms.

6. A vehicle in accordance with claim 1 further comprising a linkage system connected to each end of said stabilizer bar and to each said wheel pivot plate for allowing relative displacement of said left wheels and said right wheels.

7. A vehicle comprising:
 a. a chassis having a left side and a right side;
 b. a suspension system connected to said chassis and at least two wheels mounted for rotation on said suspension system on said left side of said vehicle and at least two wheels mounted for rotation on said suspension system on said right side of said vehicle and adapted for allowing said two left wheels to move up and down about a pivot point between them and for allowing two said right wheels to move up and down about a pivot point between them; and
 c. means for driving said wheels operatively connected to said wheels,
 said two left wheels being mounted on a left wheel pivot plate and said two right wheels being mounted on a separate right wheel pivot plate, said wheel pivot plates being mounted for pivotal rotation on a single axle that is mounted on said chassis transversely to a length of said vehicle, said axle being fixed in said chassis, said vehicle further comprising a stabilizer system limiting the up or down motion of said four wheels in response to obstacles encountered on the ground, said stabilizer system further comprising a stabilizer bar pivotally connected to a lower surface of said chassis for movement in a vertical plane and to each said wheel pivot plates.

8. A vehicle in accordance with claim 7 further comprising a linkage system connected to each end of said stabilizer bar and to each said wheel pivot plate for allowing relative displacement of said left wheels and said right wheels.

9. A vehicle comprising:
 a. a chassis having a left side and a right side;
 b. a suspension system connected to said chassis and at least two wheels mounted for rotation on said suspension system on said left side of said vehicle on a left side wheel pivot plate and at least two wheels mounted for rotation on said suspension system on said right side of said vehicle on a right side wheel pivot plate and adapted for allowing said two left wheels to move up and down about a pivot point between them and for allowing two said right wheels to move up and down about a pivot point between them by pivotally mounting said left side wheel pivot plate and said right side pivot plate on opposite ends of an axle having two ends and mounted in said chassis transversely to the length of said vehicle, said axle being fixed in said chassis; and
 c. means for driving said wheels operatively connected to said wheels,
 said vehicle further comprising a stabilizer system connected to said left side wheel pivot plate and to said right side wheel pivot plate and to said chassis of said vehicle limiting the up or down motion of said four wheels in response to obstacles encountered on the ground, said stabilizer system further comprising a stabilizer bar pivotally connected to a lower surface of said chassis for movement in a vertical plane and means for linking said stabilizer bar to said left side wheel pivot plate and to said right side pivot plate for allowing relative displacement of said left wheels and said right wheels.

\* \* \* \* \*